United States Patent
LaLone et al.

[11] Patent Number: 6,138,715
[45] Date of Patent: Oct. 31, 2000

[54] ONE-PIECE BALLKEY

[75] Inventors: Luann M. LaLone, Adams; Robert L. Neulieb, Theresa, both of N.Y.

[73] Assignee: New York Air Brake Corporation, Watertown, N.Y.

[21] Appl. No.: 09/204,505

[22] Filed: Dec. 4, 1998

[51] Int. Cl.[7] .............................. F16K 5/06; F16K 17/40
[52] U.S. Cl. ..................... 137/797; 251/79; 251/315.16
[58] Field of Search ................................ 137/797; 251/79, 251/315.16, 315.01, 315.03, 315.05

[56] References Cited

U.S. PATENT DOCUMENTS

| | | |
|---|---|---|
| 3,184,212 | 5/1965 | Billeter . |
| 3,656,711 | 4/1972 | Toelke ............................... 251/315.16 |
| 3,794,071 | 2/1974 | Scott . |
| 4,051,866 | 10/1977 | Bake et al. .............................. 137/797 |
| 4,099,543 | 7/1978 | Mong et al. . |
| 4,125,128 | 11/1978 | Elward et al. . |
| 4,158,369 | 6/1979 | Störzinger et al. . |
| 4,456,219 | 6/1984 | Scott et al. . |
| 4,548,237 | 10/1985 | Bogenschutz . |
| 4,744,390 | 5/1988 | Henry ...................................... 137/797 |
| 4,765,591 | 8/1988 | Bodnar ................................... 137/797 |
| 5,072,913 | 12/1991 | Carroll et al. . |
| 5,228,648 | 7/1993 | Stahmer . |
| 5,544,675 | 8/1996 | Dean ....................................... 137/797 |

Primary Examiner—Kevin Shaver
Assistant Examiner—Eric Keasel
Attorney, Agent, or Firm—Barnes & Thornburg

[57] ABSTRACT

A valve wherein the stem and valve element are a unitary structure and the stem includes a weakened section adjacent the exterior of the body. Preferably, the unitary structure is a one-piece molded plastic structure. The weakened section is exterior of the body and may be a circumferential groove.

18 Claims, 6 Drawing Sheets

ONE-PIECE BALLKEY

BACKGROUND AND SUMMARY OF THE INVENTION

The present invention relates generally to valves and more specifically to valves for use in a pneumatic brake system for rail vehicles.

Valves, for example, angle cocks in the rail industry, is illustrated in FIG. 1, generally includes a body 1 and a valve element 3, illustrated as a ball, between seats 2 within the body 1. A stem 5 is received within the ball 3 and includes a key 4. Washer 6 is provided on the stem 5 as are O-ring seal 7. A gasket 8 is positioned between the body 1 and a cover 9 which is secured to the body 1 by fastener 10. The handle 14 is secured to the key 4 by socket 12 and pin 11. Pin 13 connects the pivotal portion of the handle 14 to the socket 12. Rings 15 and 16 are secured to the threaded portion of the housing 1 by nut 17.

The stem 5 included a perturbance 18 which was received in slot 19 of valve element 3. The connection can best be seen in FIG. 2. Generally, the valve element or ball 3 is made of brass or aluminum and the stem 5 or perturbance 18 is made of steel. In the field, sometimes the valve element 3 gets stuck. In order to gain appropriate leverage, a pipe is usually fitted over the handle 14 to create a greater lever or moment. Depending upon the age of the valve and what makes it stick, the stem 5 may break at perturbance 18. The operator would not know that the valve elements have not moved since the connection of stem 5 to ball 3 is interior of the housing.

A similar valve structure for the dirt collector and cut-off cock of a railroad pneumatic brake system is illustrated in FIG. 3. The body 21 receives seats 22 and valve or ball element 23. A stem 25 with a key 24 is received in the valve element 23. Washer 26 and O-rings 27 are received on the stem 25. A gasket 28 is a seal between the cover 29 and the body 21 and is held thereto by fastener 30. The handle 31 is secured to the key 24 of the stem 25 by pin 31. A gasket 33 is between the bowl 35 and the body 21 and is secured thereto by fastener 36 and nut 37. A valve 34 is provided in the bowl 35. The valve element 23 and stem 25 are connected by perturbance 38 of the stem 25 in recess 39 in the valve element 23. The same problem occurs where excess force will cause a breakage of the perturbance 38 which is interior the body 21. Although the use of metal handles, stems and valve element increase longevity of the individual elements, an inherent weak point at the junction of the stem to the ball. Also, the metal pieces are not inexpensive.

The present invention is a valve including a body, a valve element stem extending from the valve element exterior of the body and a handle connected to the stem for moving the valve element. The stem and valve element are a unitary structure and the stem includes a weakened section adjacent the exterior of the body. Preferably, the unitary structure is a one-piece molded plastic structure. The body and the handle may be metal. The weakened section is exterior of the body and may be a circumferential groove. The stem includes a key to which the handle is connected and the weakened section is between the key and the valve element. The valve element may be a ball and may be part of an angle cock, dirt collector and cut-off valve or a retainer valve. The plastic unitary structure may be fiberglass re-enforced. It may also be made of high strength, high temperature and low friction plastic material.

Other objects, advantages and novel features of the present invention will become apparent from the following detailed description of the invention when considered in conjunction with the accompanying drawings.

BRIEF DESCRIPTION OF THE PREFERRED EMBODIMENTS

Figure 1:
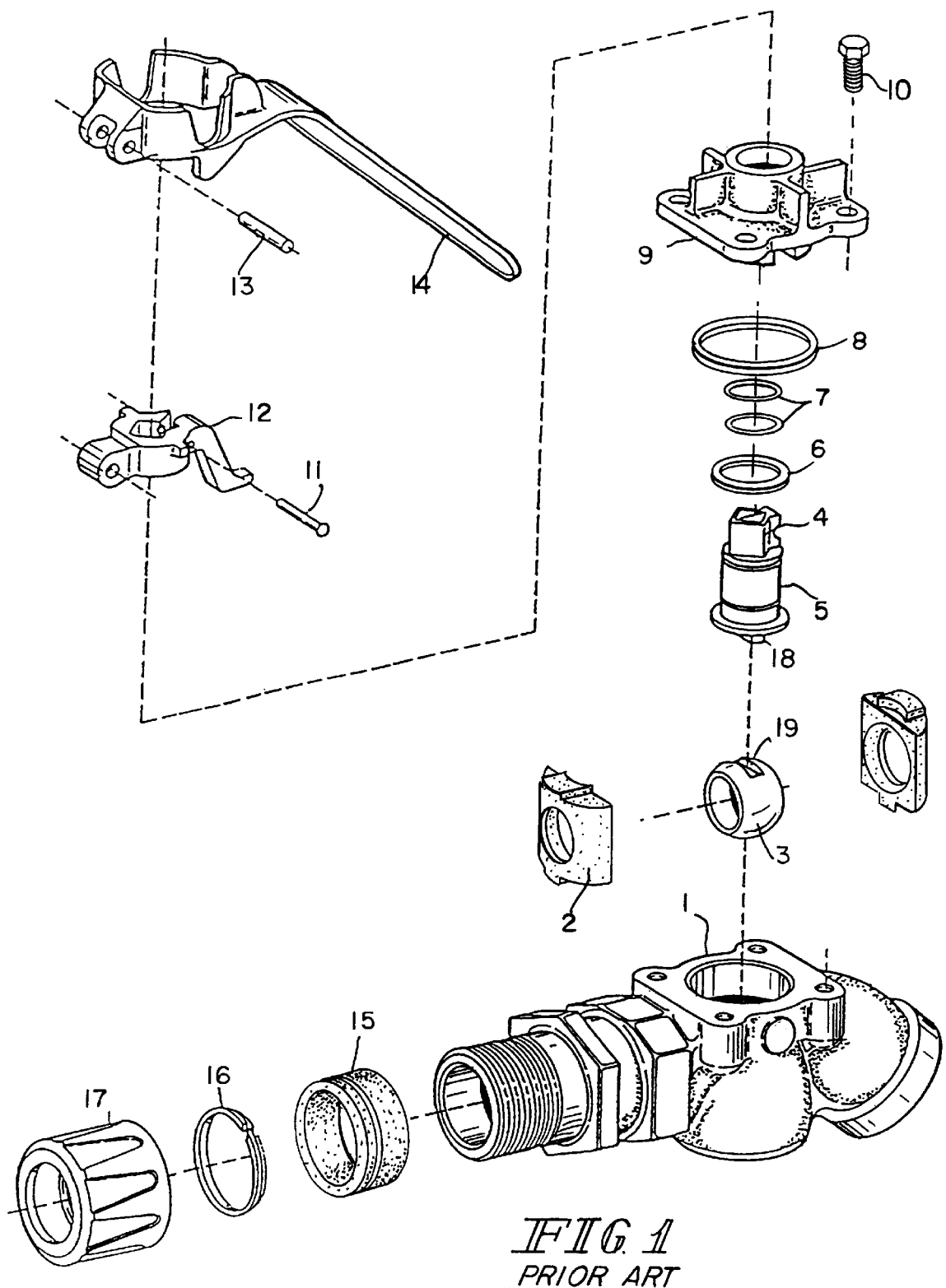
FIG. 1 is an exploded view of an angle cock of the prior art.
Figure 2:
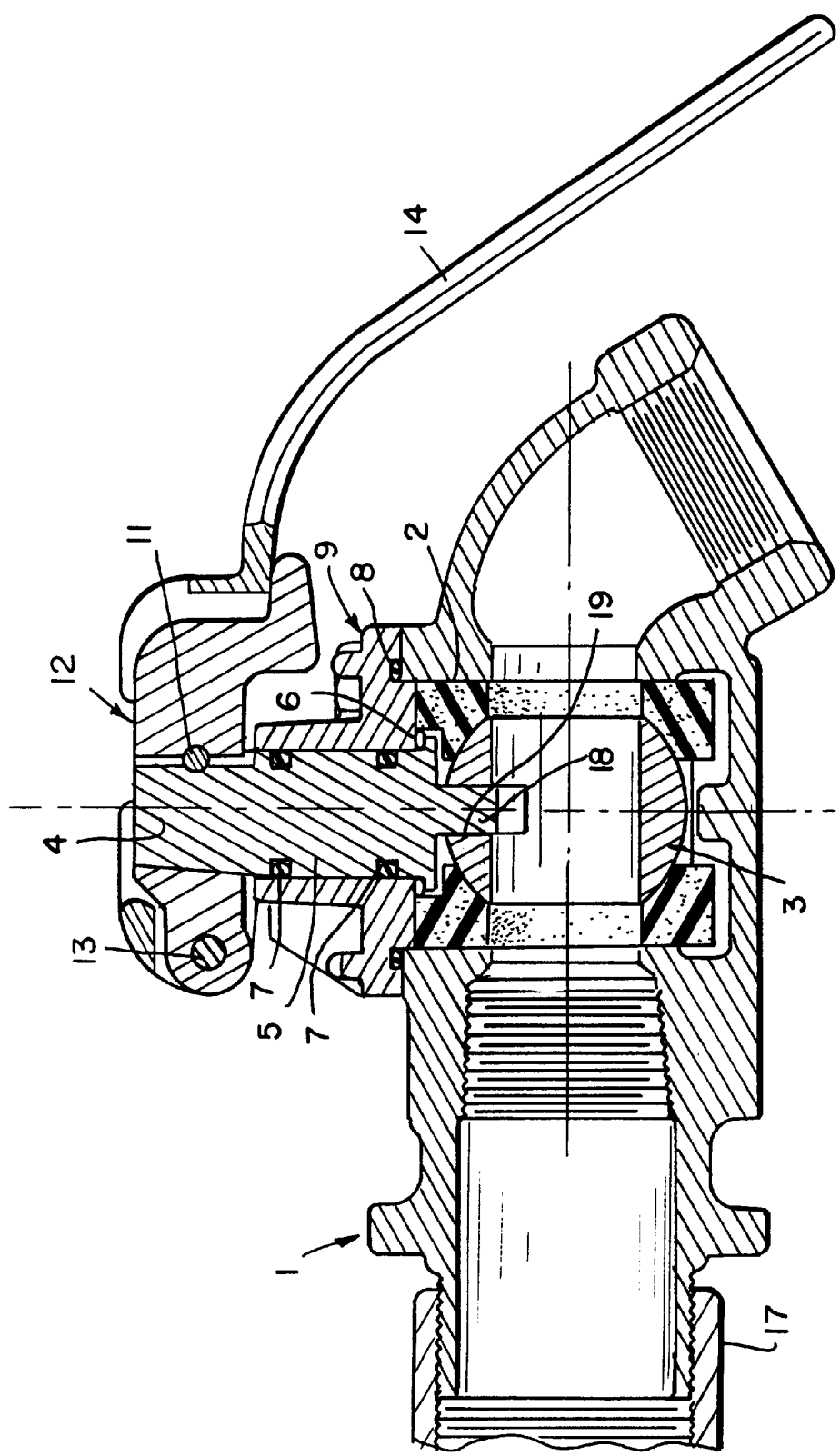
FIG. 2 is a cross-sectional view of an assembled angle cock of FIG. 1 of the prior art.
Figure 6:
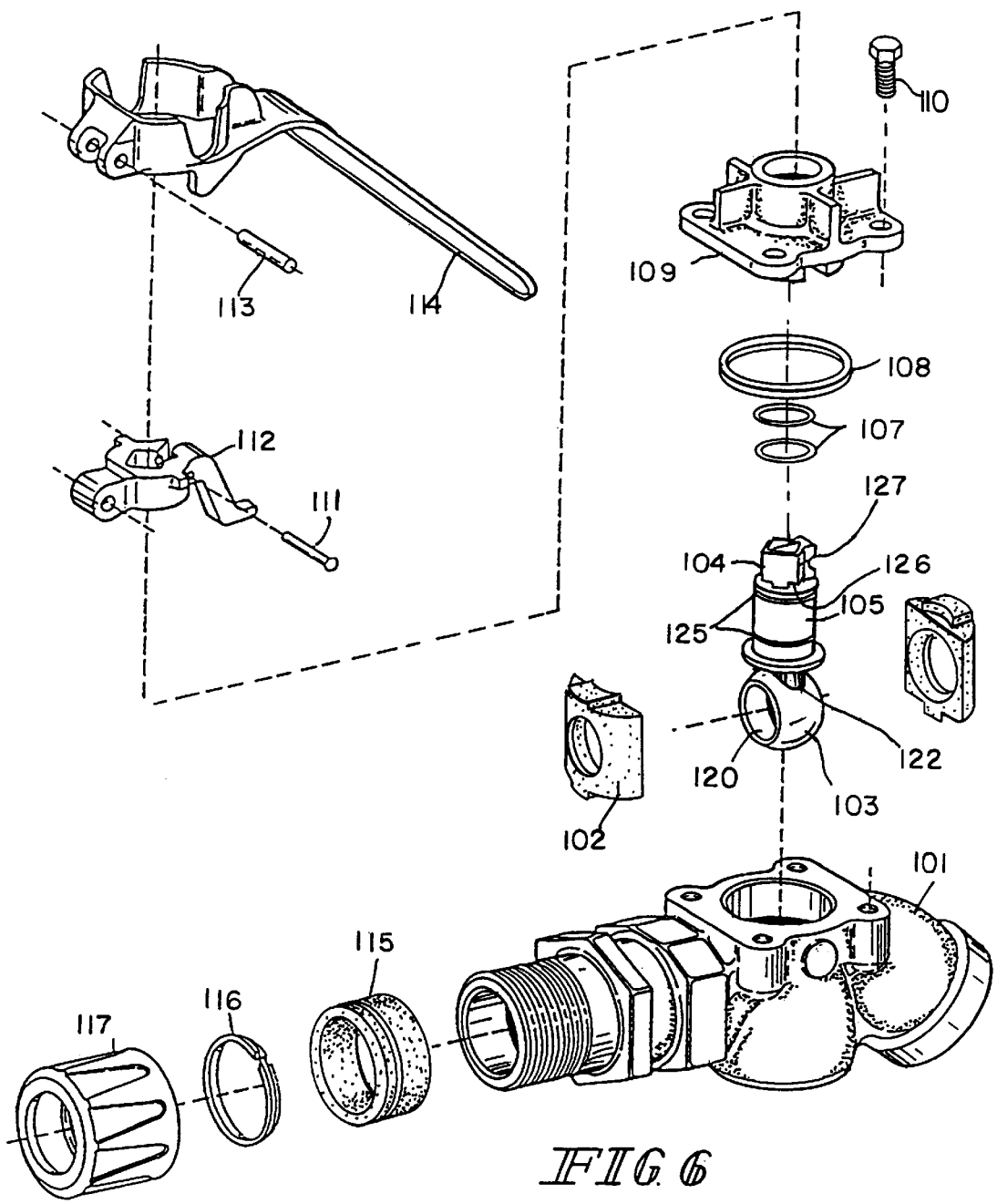
FIG. 6 is an exploded view of an angle cock using the unitary valve structure according to the principles of the present invention.

A valve designed specifically for the pneumatic brake system of a railroad vehicle incorporating the principles of the present invention is illustrated in FIG. 6. For purposes of example, the angle cock will be used. As will be explained below, the same concept can be used on the dirt collector and cut-off valve as well as the retainer valve. The reference numbers in FIG. 6 correspond to those of FIG. 1 in the units and tens place. They serve the same function.

The valve of FIG. 6 includes a body 101 which receives ball seats 102. A unitary structure including a valve element 103 with a stem 105 and a key 104. O-ring seals 107 are provided on the stem 105. A gasket 108 is provided between the cover 109 and the base 101. A fastener 110 secures the cover 109 to the base 101. A socket 112 is secured to the key 104 of shaft 105 by pin 111. A locking handle 114 is pivotally connected to the socket 112 by pin 113. A compression ring 115 and an anti-extrusion ring 116 are secured to the base 101 by nut 117.

Figure 3:
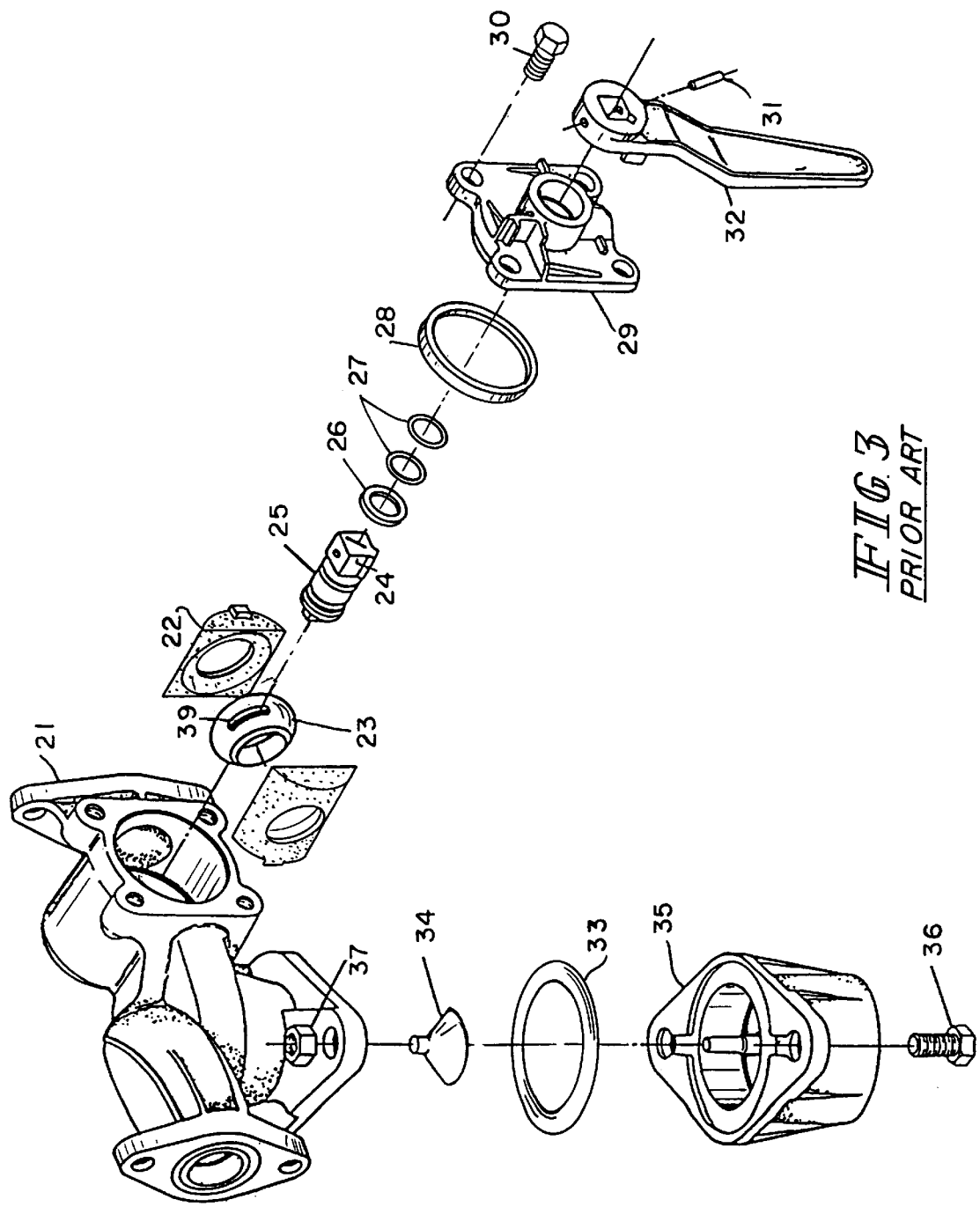
FIG. 3 is an exploded view of a dirt collector and cut-off valve of the prior art.
Figure 4:
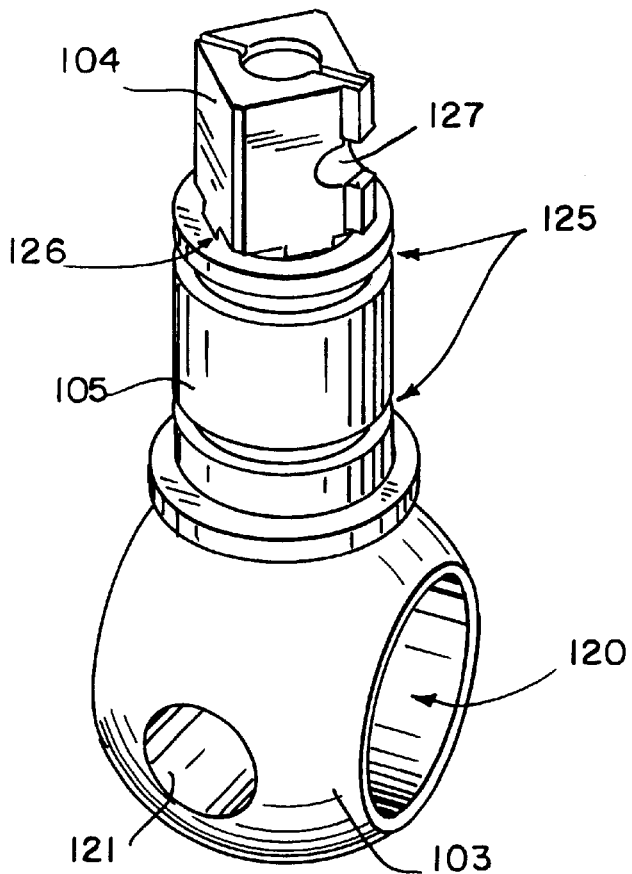
FIG. 4 is a perspective view of a unitary valve element and stem according to the principles of the present invention.
Figure 5:
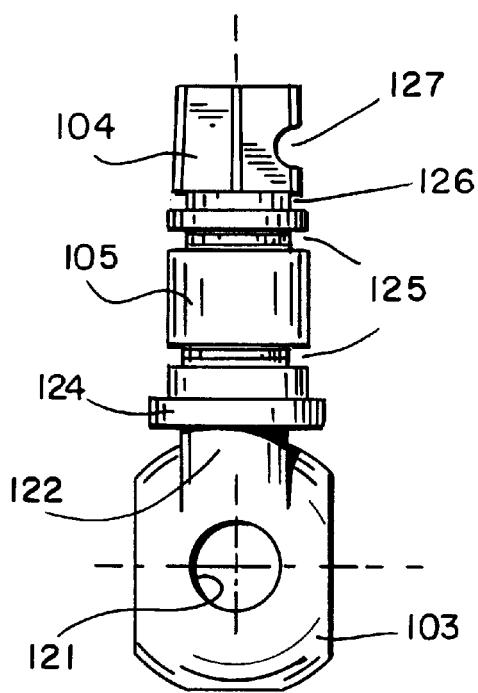
FIG. 5 is a side view of the unitary structure of FIG. 4.

The details of the unitary structure of the valve element 103, the stem 105 and the key 104 are illustrated specifically in FIGS. 4 and 5. The valving portion 103 includes a through passage 120 and a closed off passage 121. The valve element portion 103 is separated from the stem portion 105 by a transition portion 122 and a collar 124. The stem 105 includes a pair of circumferential recesses 125 which receive the gasket or O-rings 107. The washer 6 in FIG. 1 and 26 of FIG. 3 have been eliminated since there is no metal to metal contact requiring a wear element. A recess 127 receives pin 111 to secure the socket 112 to the key 104.

Figure 7:
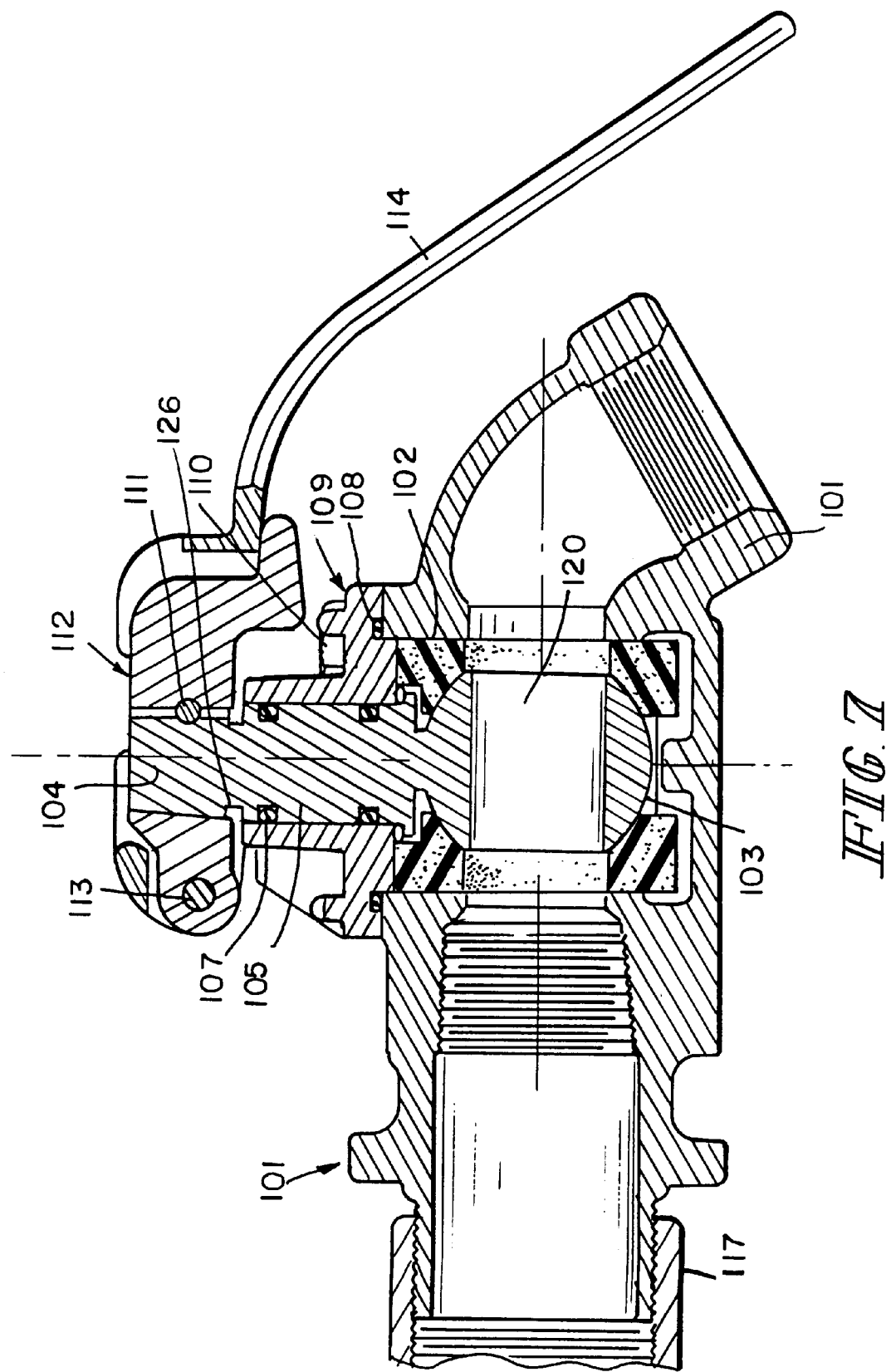
FIG. 7 is a cross-sectional view of an assembled angle cock of FIG. 6.

A weakened transition portion 126 is provided between the stem portion 105 and the key portion 104. The weakened portion 126, as shown in FIG. 7, is adjacent to the exterior of body 101 and is generally exterior the body 101. The weakened portion 126 is created as a circumferential recess. When excess force is applied to the handle 114, the shear braking point or fuse element 126 will break causing the handle 114 to fall off. This provides a very visual indication that the stem 105 does not operate the valve portion 103. Although the weakened portion 126 is exterior the body 101, it should be anywhere adjacent the exterior of the body, even including the interior of the body as long as the break occurs and the handle falls off or the disconnection is visible from the exterior of the housing.

Because of the environment in which the valve is to function, preferably the body 101 is made out of metal as is the handle 114. Although applicant is investigating plastic handles, substantial savings and improved operation is achieved by making the unitary structure of the valve element 103, the stem 105 and the key 104 as a molded plastic product. Preferably, the structure is fiberglass re-enforced and made out of a high strength, high temperature, low friction plastic material. An example of this material would be a long glass fiber, reinforced, heat stabilized polyphthalamide (PPA) UV stabilized material. One example is LNPUF-700-10 HSBK8-385. The weakened section 126 has been designed and tested to break at over seven times the allowable opening/closing torque required for the valve. The allowable opening/closing torque required is 175 inch-pounds and the test have withstood up to 110 foot-pounds.

The same unitary structure of the ball element 103, the shaft 105 and the key 104 may also be included in the dirt collector and cut-off valve illustrated in FIG. 3. It would replace parts 23, 24, 25 and 26. Other types of railroad valve structures which the unitary structure may be used would be, for example, a retainer valve.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A valve including a body, a valve element in the body, the valve element having an open position and a closed position, a stem extending from the valve element to the exterior of the body and a handle connected to the stem, the handle enabling an operator to selectively rotate the valve element to the open and closed positions, wherein:
   the stem includes a weakened section adjacent the exterior of the body; and
   the stem and the valve element are formed as a monolithic, one-piece structure so as to strengthen the valve and thereby reduce the risk that the valve may fracture internally of the body.

2. A valve according to claim 1, wherein the unitary structure is a one piece molded plastic structure.

3. A valve according to claim 2, wherein the body is metal.

4. A valve according to claim 1, wherein the weakened section is exterior the body.

5. A valve according to claim 1, wherein the weakened section is a circumferential groove exterior the body.

6. A valve according to claim 1, wherein the stem includes a key to which the handle is connected and the weakened section is between the key and the valve element.

7. A valve according to claim 1, wherein the valve element is a ball.

8. A valve according to claim 1, wherein the valve is an angle cock for a rail pneumatic brake system.

9. A valve according to claim 1, wherein the valve is a dirt collector and cut-out cock for a rail pneumatic brake system.

10. A valve including a body, a valve element in the body, the valve having an open position and a closed position, a stem extending from the valve element exterior the body and a handle connected to the stem for rotatably moving the valve element to the open and closed positions, wherein:
    the stem and the valve element are formed as a monolithic, one piece molded plastic structure, wherein the stem includes a weakended section; and
    the body and the handle are metal.

11. A valve according to claim 10, wherein the weakended section is exterior the body.

12. A valve according to claim 10, wherein the weakened section comprises a circumferential groove exterior the body.

13. A valve according to claim 10, wherein the stem includes a key to which the handle is connected and the weakened section is formed between the key and the valve element.

14. A valve according to claim 10, wherein the valve element is a ball.

15. A valve according to claim 10, wherein the valve is an angle cock for a rail pneumatic brake system.

16. A valve according to claim 10, wherein the valve is a dirt collector and cut-out cock for a rail pneumatic brake system.

17. A valve according to claim 10, wherein the structure is fiber glass re-enforced.

18. A valve according to claim 10, wherein the structure is of a high strength, high temperature and low friction plastic material.

* * * * *